Patented Feb. 6, 1923.

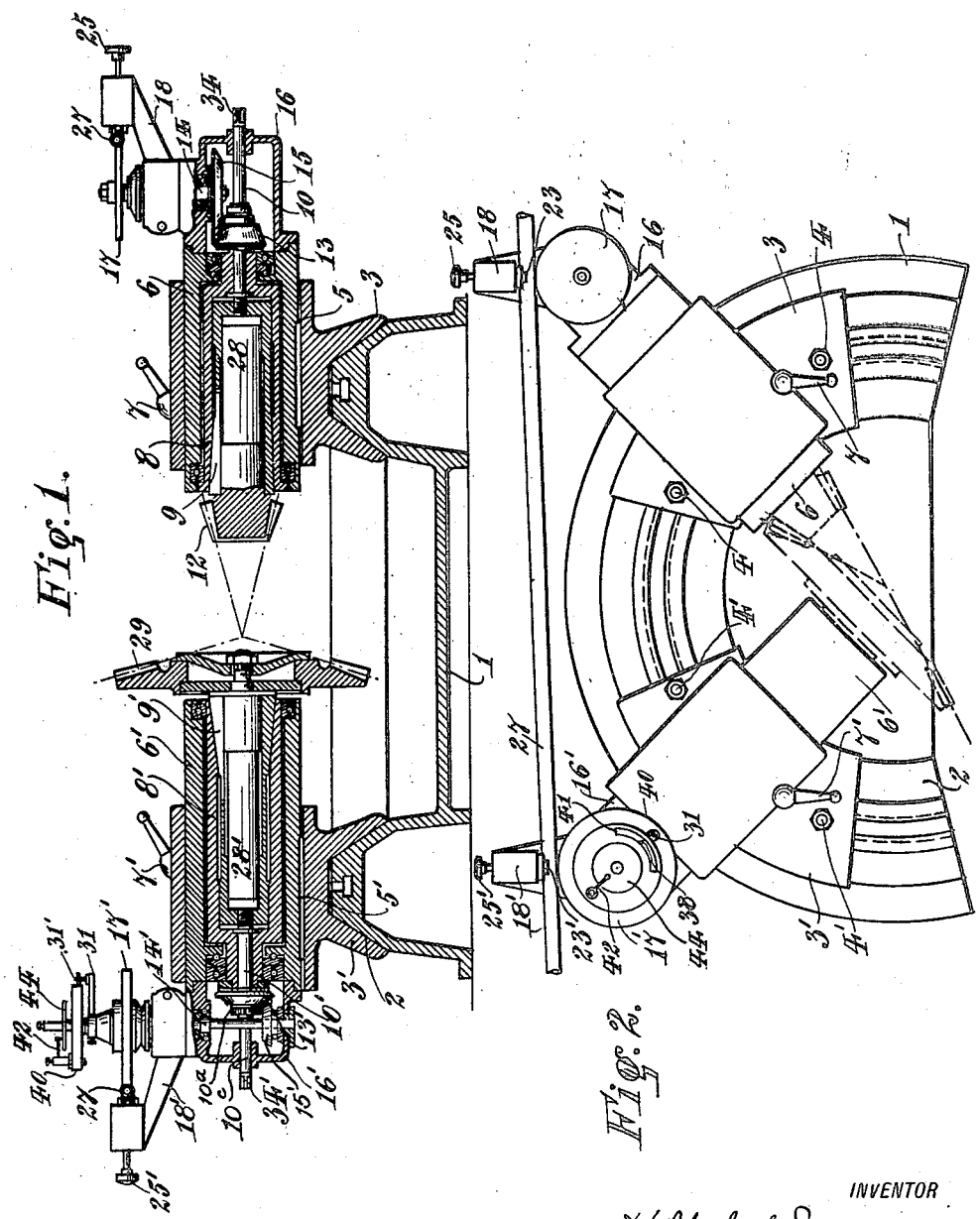

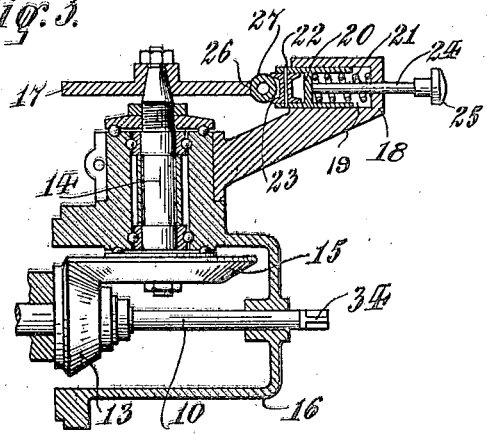
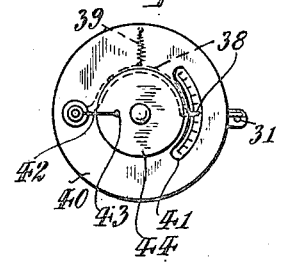
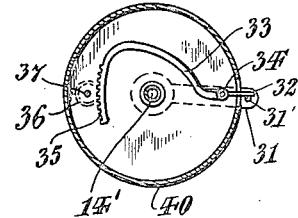
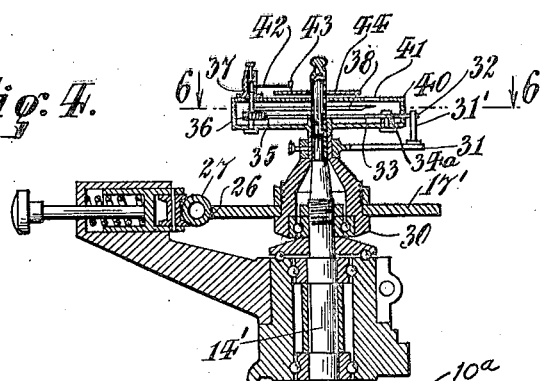
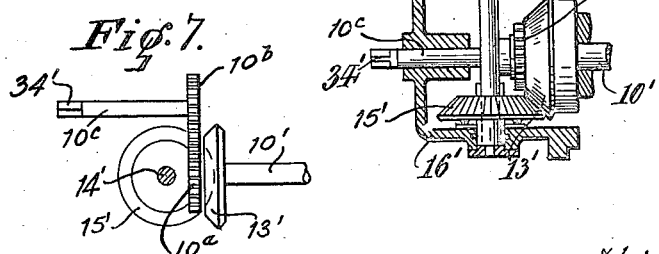

1,444,526

UNITED STATES PATENT OFFICE.

HIPPOLYT SAURER, OF MANNENBACH, SWITZERLAND, ASSIGNOR TO SOCIETE ANONYME ADOLPHE SAURER, OF ARBON, SWITZERLAND, A CORPORATION OF SWITZERLAND.

APPARATUS FOR TESTING BEVEL-GEAR WHEELS.

Application filed March 30, 1920, Serial No. 370,021. Renewed May 26, 1922. Serial No. 563,951.

*To all whom it may concern:*

Be it known that I, HIPPOLYT SAURER, a citizen of the Swiss Republic, residing at Schloss Eugensberg, Mannenbach, Canton Thurgau, Switzerland, have invented certain new and useful Improvements in Apparatus for Testing Bevel-Gear Wheels, of which the following is a specification, reference being had to the accompanying drawings, forming a part hereof.

In my prior Patent 1,263,472, issued April 23rd, 1918 (Reissue 15,013, dated December 21, 1920) I have disclosed and broadly claimed an apparatus for testing gear wheels, the purpose of which is to indicate and make a record of imperfections or inaccuracies in the concentricity spacing and form of the teeth of a pair of intermeshing gears. These gears may be as they come from the gear cutting machine, or one may be a master gear. The indication or record made by the apparatus permits such imperfections and inaccuracies to be removed or corrected, and the errors or defects in the gear cutting machine, by which such imperfections and inaccuracies were caused, to be remedied and the gears thereafter cut be free from the indicated errors and defects.

A comparison of the rolling action of the pair of gears to be tested with the rolling action of two circular disks of appropriate diameter ratio is secured by an indicating or recording mechanism which preferably includes a dial, scale or record blank rotated in harmony with one of the gears and an index finger, pointer or stylus influenced by the acceleration and deceleration of one gear in respect to the other as the successive teeth come into and pass through meshing position. The movement of the pointer or stylus in respect to the dial or record blank indicates or records every departure of either gear from true tooth formation, concentricity, or spacing. The actuating mechanism for the pointer or stylus includes two relatively rotatable members, one operated in harmony with one gear and the other in harmony with the other gear, and connections between both members and the pointer or stylus whereby readily appreciable movements of the latter result from very slight variations of the rate of rotation of said members.

My present invention is an improvement in the general type of apparatus above referred to, and the main object of my invention is to provide certain novel features whereby the device is adapted for the testing of bevel gears. A further object is to adapt the device for testing gears of various sizes, transmission ratios and angles of axis intersection. A further object is to provide simple means whereby the proper transmission of motion to the members of the indicating mechanism may be secured without the necessity for changing both of the disks for each change in pitch diameter or pitch ratio of the gears to be tested, and irrespective of wide variations in angle or position.

As an important feature of my invention whereby it is adapted for the testing of bevel gears, I provide carriers for the gears whereby the gears may be rotatably supported in mesh with their axes intersecting. As another important feature whereby it is adapted for gears of different pitch diameters, I provide means whereby the shafts or other carriers may be adjusted lengthwise of the axes of their respective gears. As another important feature whereby it is adapted for gears whose axes intersect at different angles, I make the carriers angularly adjustable in respect to each other.

For transmitting motion from gears mounted on adjustable carriers, to the members of the indicating mechanism, irrespective of whether the gears be of bevel or spur type, and irrespective of whether the adjustment of the carriers be endwise, lateral, or angular, I provide transmission means which automatically accommodates itself to all possible different relative positions of the carriers, and which does not require any substitution of parts when one pair of gears is replaced by another pair of different diameters or angle of intersection of gear axes, but of the same gear transmission ratio. As one important feature, this means for driving one member of the indicating mechanism includes a pair of spaced transmission disks of diameters appropriate to the gears to be tested and a transmission bar or other member having rectilinear movement in rolling contact with said disks. One disk of said pair may be rotated by and in harmony with one of the gears, and the other disk may operate one part of the indicating mechanism.

In the accompanying drawings in which the invention is illustrated—

Figure 1 is a view of the improved apparatus partly in elevation and partly in section in the planes of the axes of the gears to be tested.

Figure 2 is a top view of the same.

Figure 3 is a detail view on a larger scale and in vertical section of a portion of the apparatus shown at the right hand end of Figure 1.

Figure 4 is a similar view of a portion of the apparatus shown at the left hand end of Figure 1.

Figures 5 and 6 are detail views of the indicating and recording mechanism.

Figure 7 is a detail view illustrating the arrangement of the gears shown in Figure 4.

The base 1 of the apparatus shown in the drawings forms an arcuate or approximately semi-circular track 2 on which are mounted laterally movable slides or carriers 3, 3', which can be secured by bolts 4, 4' in relative positions determined by the angle of intersection of the axes of the two gears to be tested, and with the point of intersection at the center of curvature of the track and the axes radial of the track. In the carriers 3, 3' respectively are mounted the sleeve-like supports 6, 6' which can be moved longitudinally, so as to permit the proper positioning and intermeshing of gears of different sizes or gear ratio to be tested, the supports, which for convenience are cylindrical in form, being held from rotation in the carriers by suitable splines 5, 5' and held in adjusted position by clamping bolts 7, 7'. Within the supports 6, 6' respectively are mounted rotatably the sleeves 8, 8', the bore of each being tapered inwardly, as clearly shown in Fig. 1, to receive the corresponding outwardly tapered and split chuck sleeve 9, 9', adapted to receive the shaft or spindle 28, 28' of the corresponding bevel gear. In order that each chuck sleeve may be drawn into the corresponding rotatable sleeve and thereby made to grip tightly the shaft or spindle of the corresponding bevel gear, it is engaged at its inner end by a threaded spindle 10, 10'. The spindle 10 is formed at its outer end, as at 34, for engagement by a suitable wrench. The spindle 10', however, being in the same vertical plane with the shaft 14', which is necessarily extended below the spindle 10', cannot itself be formed, outside the casing 16' for engagement by a suitable wrench. To accomplish the desired result the spindle 10', which has fixed thereto the friction gear 13' for engagement with the friction gear 15', on the shaft 14' below the axis of the spindle 10', has secured thereon a gear $10^a$, Fig. 7, which is engaged by a gear $10^b$ on a second spindle $10^c$ which is mounted in a bearing in the casing 16' and has its outer end, as at 34', formed for engagement by a suitable wrench.

Thus the gear shafts or spindles are freely rotatable but may be rigidly clamped against any other movement, and with their axes intersecting at a fixed point and lying along radial lines from said fixed center. The shafts or spindles are angularly adjustable to receive pairs of intermeshing gears whose respective angles of axis intersection vary through wide limits and without regard to gear ratio. The shafts or spindles are adjustable longitudinally, that is, in the direction of their axes, for pairs of gears of larger or smaller size, and the same gear ratio, or for gears of different transmission ratio and without regard to the angle between their axes.

Each rotatable sleeve 8, 8' drives, through suitable beveled transmission wheels 13, 15 and 13', 15', corresponding vertical shafts 14, 14', mounted in suitable bearings in the casings 16, 16' carried by the sleeve-like supports 6, 6'. The beveled transmission wheels 13, 15 and 13', 15' are preferably friction gears, since they can be made perfectly circular and thereby I avoid the possibility of the indication or record made by the apparatus being affected or modified as it might be if intermeshing tooth gears were employed. The resistance offered to the rotation of the shafts 14, 14' is so slight that when the parts of the apparatus are properly constructed there is no danger of slip between the bevel friction gears. It will be understood that each gear 13, 13' is secured rigidly to the corresponding rotatable sleeve 8, 8', and that the corresponding spindle 10, 10' passes freely through the gears. It will be noted that the parallel shafts 14, 14' lie in a plane at right angles to the plane of the axes of the gears to be tested, and that although they are moved in respect to each other by the angular and longitudinal adjustment of the gear supports, they maintain their parallelism at all times. It will also be noted that the ratio of the bevel friction gears 13, 15 is not the same as that of the bevel friction gears 13', 15', it being necessary in the operation of the apparatus that the gear ratios shall be different in order that the stylus and the record card hereinafter mentioned shall rotate at different rates and the stylus trace on the record card a spiral instead of remaining at one point.

One of the vertical shafts 14, 14', as, for example, the right hand shaft, has secured at its upper end, above the casing 16, a transmission gear or wheel 17, which is preferably also a friction disk since it can be made truly circular and, for the reasons stated, there is no danger of slip. The other shaft 14' has secured at its upper end the casing 40 of the indicating and recording mechanism to be described. Between the casing 16' and the casing 40 of the indicating and recording mechanism is mounted loosely on the shaft 14' a sleeve 30 which carries a transmission wheel or gear 17', corresponding to the transmission wheel or gear 17 and, like it, preferably a truly circular friction disk.

Movement of rotation imparted by hand to one of the gears 12, 29, to be tested and in mesh, is transmitted from the gear 12 by the described intermediate devices to the transmission disk 17 and thence to the transmission disk 17' through a bar 27 (Figure 2) in driving engagement with both transmission disks 17, 17'. The bar has an endwise or rectilinear movement in rolling contact with the two disks. As shown, the bar 27, substantially circular in section, is flattened at 26 for driving contact with the edge of the transmission disks 17, 17', and is held in such driving contact by a pair of grooved rollers 23 (Figures 2 and 3) each mounted on a spindle 22 which is carried by a plunger 20. The plungers are supported in suitable chambers 19 formed in bracket arms 18, 18', which are supported by split bands with a tight frictional fit on cylindrical hubs formed on the upper part of the corresponding casings 16, 16'. The plungers are made to press the bar 27 into driving contact with the disks 17, 17' by springs 21 enclosed within the chambers 19 and may be withdrawn when desired by stems 24 provided with knobs 25, 25'. The rotary adjustability of the arms 18, 18' on the casings 16, 16' permits the transmission mechanism to be accommodated to different relative angular positions of the carriers 3, 3', and endwise adjustment of the supports 6, 6'. It will now be understood that the transmission disk or gear 17' is driven from the gear 12 to be tested by such means that the rotation of the transmission disk or gear 17' is not affected or influenced by any irregularities, inaccuracies or imperfections in either gear 12 or 29 and that the casing or support 40 of the indicating and recording mechanism, which is driven from the gear 12 through the intermeshing gear 29 will be displaced angularly, with respect to the disk 17', in one direction or the other, by every irregularity, imperfection or inaccuracy in the teeth of either of the intermeshing gears. The function of the indicating or recording mechanism is therefore to indicate or record every such relative angular displacement. To permit the performance of this function there is secured to the sleeve 30 (see Figure 4) which rotates with the disk 17', an arm 31 which carries at its extremity a driving finger 31' for contact with the projecting short arm 32 of a lever 33 which is pivoted at 34ª on the lower member of the casing 40. The lever 33 carries a segment 35 (see Figure 6) which engages a pinion 36 on a short vertical shaft 37 mounted in the casing. An index finger or pointer 38, carried by the shaft 37 and held normally in central position by a spring 39 (see Figure 5) which acts in opposition to the pressure of the driving finger 31' of the arm 31, is visible through a sight opening 41 in the upper member of the casing or support 40, over a scale which may be marked on the lower member of the casing. The shaft 37 carries, above the casing, an arm 42 provided with a stylus 43 which may trace a line on a card 44, carried by the shaft 14'.

In the operation of the apparatus, if the two gears 12 and 29 are perfect in all respects and the disk 17' and the casing or support 40 were rotated at the same rate, the pointer 38 would remain fixed with respect to the scale and the stylus 43 would remain fixed with respect to the card 44. If the rate of rotation of the support 40 is not the same as that of the disk 17', as will be the case when the ratio of the gears 13', 15' is not the same as that of gears 13, 15, the pointer 38 will move gradually from its zero position and the stylus will trace a smooth line on the card, but any irregularity, imperfection or inaccuracy in either of the gears will cause a temporary relative angular displacement of the disk 17' and the support 40 and will therefore cause a more or less sudden and easily observable movement of the index finger or pointer and a corresponding marking of the card by the stylus. As the apparatus is operated slowly by hand and under close observation, the indicating device will ordinarily be sufficient without a recording device, but the recording device alone may be used and serve also as an indicating device. When any defect is indicated by the movement of the index finger or pointer the rotation of the gears will be stopped and by examination of the gears at the point where they are then in mesh the location and character of the defect can be determined and the change in the gear cutting machine necessary to overcome such defect can be made.

It will be understood that various changes in details of construction, arrangement and relation of parts can be made to suit different conditions of use or convenience in manufacture and that the invention is not limited to the precise construction shown and described herein.

I claim as my invention:

1. In an apparatus for testing bevel gear wheels, the combination of a circular track, relatively movable carriers mounted on said track, devices mounted on said carriers for supporting rotatably and in mesh the gears to be tested with their axes radial of said track, indicating mechanism comprising relatively displaceable members, intermediate devices whereby one member of the indicating mechanism is rotated in harmony with one of said gears and intermediate mechanism whereby the other member of the indicating mechanism is rotated in harmony with the other of said gears.

2. In an apparatus for testing gears the combination of two rotatable members for supporting in mesh the gears to be tested, shafts corresponding respectively to said members, gearing between each member and its corresponding shaft, whereby the shafts are driven from said members, an indicating mechanism comprising two relatively displaceable members, means whereby one of said displaceable members is rotated in harmony with one of said shafts, and means whereby the other of said displaceable members is rotated in harmony with the other of said shafts.

3. In an apparatus for testing gear wheels, the combination of two rotatable members for supporting in mesh the gears to be tested, a support on which said members are relatively adjustably carried, an indicating mechanism comprising two relatively displaceable members, means whereby one of said last named members is rotated in harmony with one of said gears, a transmission disk in operative relation with the other of said gears, a second transmission disk in operative relation with the other member of the indicating mechanism, a transmission bar, and means to hold said bar in driving engagement with said disks.

4. In an apparatus for testing bevel gear wheels, the combination of a circular track, relatively movable carriers mounted on said track, devices mounted on said carrier for supporting rotatably and in mesh the gears to be tested with their axes radial of said track, indicating mechanism comprising relatively displaceable members, means whereby one of said members is rotated in harmony with one of said gears, a transmission gear in operative relation with the other of said displaceable members, a second transmission gear in operative relation with the other of the gears to be tested, and means whereby one of said transmission gears is driven from the other in varying positions of said carriers.

5. In an apparatus for testing gear wheels, the combination of a support, relatively movable carriers mounted thereon, devices mounted on said carriers for supporting rotatably and in mesh the gears to be tested, indicating mechanism comprising relatively displaceable members, means whereby one of said members is rotated in harmony with one of said gears, a transmission gear in operative relation with the other of said displaceable members, a second transmission gear in operative relation with the other of the gears to be tested, a transmission bar, and means to hold said bar in driving engagement with said gears in varying positions of said carriers.

6. In an apparatus for testing gear wheels, the combination of a support, relatively movable carriers mounted thereon, devices mounted on said carrier for supporting rotatably and in mesh the gears to be tested, indicating mechanism comprising relatively displaceable members, means whereby one of said members is rotated in harmony with one of said gears, a transmission gear in operative relation with the other of said displaceable members, a second transmission gear in operative relation with the other of the gears to be tested, a transmission bar, arms swiveled on said carriers, spring-pressed plungers carried by said arms, and rollers carried by said plungers and arranged to press said bar into driving engagement with said gears.

7. In an apparatus for testing bevel gear wheels, the combination of a circular track, relatively movable carriers mounted on said track, a chuck mounted rotatably in each of said carriers and adapted to engage one of the gears to be tested, a shaft mounted in each of said carriers in operative relation with said chuck, a transmission gear carried by one of said shafts, an indicating mechanism supported by the other of said shafts and comprising two relatively displaceable members, a sleeve mounted loosely on said last named shaft in operative relation with one of the members of the indicating mechanism, a transmission gear on said sleeve, and means to transmit rotation from the first named transmission gear to the last named transmission gear.

8. An apparatus for testing bevel gears including a pair of supports disposed at an angle to each other, devices mounted in said supports respectively for carrying rotatably and in mesh, the bevel gears to be tested with their axes intersecting, indicating mechanism including relatively displaceable members, and operating connections between said devices and the members of said indicating mechanism respectively.

9. An apparatus for testing bevel gears including a pair of supports disposed at an angle to each other for carrying rotatably and in mesh, the bevel gears to be tested, means whereby said supports are made adjustable in the direction of the axes of their respective devices, whereby gears of different pitch diameters may be tested, and indicating mechanism including relatively displaceable members, means whereby one placeable member is driven from one device and means whereby the other member is driven from the other device, a member and means whereby said last mentioned member is operated upon a relative displacement of said first named members.

10. An apparatus for testing bevel gears, including a pair of supports disposed at an angle, to each other for carrying rotatably and in mesh the bevel gears to be tested, means whereby one of said supports is made endwise and laterally adjustable in respect to the other, a pair of relatively displaceable members, one operated by one gear and the other by the other gear, a pointer and means whereby said pointer is given different movements by constant or varying relative movements of said members.

11. An apparatus for testing bevel gears, including a pair of carriers disposed at an angle to each other, devices mounted on said carriers respectively for carrying rotatably and in mesh the bevel gears to be tested, means whereby said carriers are made angularly adjustable to vary the angle of intersection of the gear axes, a pair of relatively rotatable members, operating connections between said devices and the corresponding members, a pointer, and means whereby said pointer is moved back and forth upon relative acceleration and deceleration of said members.

12. An apparatus for testing bevel gears, including a pair of carriers, a pair of supports endwise adjustable in respect to said carriers, devices mounted in said supports respectively for mounting rotatably and in mesh the gears to be tested, a base upon which said carriers are angularly adjustable to vary the angle of intersection of the gear axes, and indicating mechanism including a part and means for operating said part by a variation in the relative rates of rotation of said gears for indicating acceleration of one gear relative to the other.

13. An apparatus for testing bevel gears, including a base, a pair of carriers mounted thereon, means whereby one of said carriers is made angularly adjustable in respect to the other, gear supports mounted in said carriers and endwise adjustable in respect thereto whereby bevel gears of various angles, diameters and ratio may be rotatably supported in mesh, and indicating mechanism including relatively displaceable members carried by one of said adjustable supports, means for operating one of said indicating members in harmony with the gear mounted on said support, and means including a power transmitting member having rectilinear motion for operating the other of said indicating members in harmony with the other gear, with the gear supports in varying angularly and longitudinally adjusted positions.

14. An apparatus for testing gears, including a pair of relatively adjustable supports for rotatably supporting in mesh the gears to be tested, an indicating mechanism including a pair of relatively displaceable members, one of said members being carried by one of said supports and driven by the gear thereof, a pair of rotatable transmission members, means connecting one transmission member to the other gear and means connecting the other transmission member to the other displaceable member and an intermediate member having rolling contact with both of said rotatable members for transmitting motion from one to the other in varying relative positions of the supports.

15. An apparatus for testing gears, including a pair of relatively adjustable supports for rotatably supporting in mesh the gears to be tested, an indicating mechanism including a pair of relatively displaceable members, one of said members being carried by one of said supports, means for driving it by the gear of said support, a pair of rotatable transmission members, means for connecting them respectively to the other gear and the other displaceable member, and a bar having rolling contact with both of said rotatable members for transmitting motion from one to the other in varying relative positions of the supports.

16. An apparatus for testing gears, including a pair of supports for rotatably mounting and in mesh the gears to be tested, an indicating mechanism including a pair of relatively displaceable members, and a pair of friction members in direct contact for transmitting motion from one gear to one of said displaceable members, means for transmitting motion from the other of said gears to the other displaceable member, including a pair of disks and a longitudinally movable member in rolling contact with both disks, whereby the relative adjustment of said supports for gears of different sizes varies the distance between said disks and the effective length of said longitudinally movable member.

17. An apparatus for testing gears, including a pair of supports for rotatably mounting in mesh the gears to be tested, a pair of members rotatable about parallel axes, means for driving one member from one gear, means for driving the other member from the other gear, an indicating mechanism including a pair of relatively displaceable members, one supported by one of said rotatable members, a pair of transmission disks, one coaxial with but independently rotatable in respect to the last mentioned rotatable member, and the other carried by the other rotatable member, and a transmission bar in rolling contact with both of said transmission disks.

18. An apparatus for testing bevel gears, including means for supporting and rotatably mounting in mesh the gears to be tested with the axes at an angle to each other, a pair of rotatable members with their axes in a plane at right angles to the plane of said first mentioned axes, means for rotating one member in harmony with one of said gears, means for rotating the other member in harmony with the other of said gears, an indicating member and means for moving it in one direction upon acceleration of one of the first named members in respect to the other, and in the opposite direction upon deceleration of said first named member in respect to the other.

19. An apparatus for testing gears, including means for supporting and rotatably mounting in mesh the gears to be tested with the axes in one plane, a pair of rotatable members with their axes in a plane at right angles to the plane of said first mentioned axes, means for rotating one member in harmony with one of said gears, means for rotating the other member in harmony with the other of said gears, an indicating part and means for operating it upon variations in the relative rates of rotation of said members.

20. An apparatus for testing bevel gears, including means for rotatably supporting a pair of gears in mesh and with their axes intersecting, a record blank support, a pivoted stylus, a pair of rotatable members, means for rotating one member in harmony with one gear, means for rotating the other member in harmony with the other gear, and an operating member for said stylus having parts engaging with each of said pair of members for swinging the stylus about its pivot upon variations in the relative rates of rotation of the members of said pair.

This specification signed this 12th day of March A. D. 1920.

HIPPOLYT SAURER.